United States Patent
Al-Maharmeh et al.

(10) Patent No.: US 12,504,721 B2
(45) Date of Patent: Dec. 23, 2025

(54) ENERGY EFFICIENT DIGITAL TO TIME CONVERTER (DTC) FOR EDGE COMPUTING

(71) Applicant: Wayne State University, Detroit, MI (US)

(72) Inventors: Hamza Al-Maharmeh, Westland, MI (US); Mohammad Alhawari, Dearborn, MI (US); Nabil Sarhan, Dearborn Heights, MI (US); Mohammed Ismail Elnaggar, Dearborn, MI (US)

(73) Assignee: Wayne State University, Detroit, MI (US)

( * ) Notice: Subject to any disclaimer, the term of this patent is extended or adjusted under 35 U.S.C. 154(b) by 213 days.

(21) Appl. No.: 18/227,613

(22) Filed: Jul. 28, 2023

(65) Prior Publication Data

US 2024/0036525 A1    Feb. 1, 2024

Related U.S. Application Data

(60) Provisional application No. 63/393,407, filed on Jul. 29, 2022.

(51) Int. Cl.
*H03M 1/00*    (2006.01)
*G04F 10/00*   (2006.01)
(Continued)

(52) U.S. Cl.
CPC .............. *G04F 10/005* (2013.01); *G06F 1/08* (2013.01); *G06F 9/54* (2013.01)

(58) Field of Classification Search
CPC ............ G04F 10/005; G06F 1/08; G06F 9/54; G06N 3/0464; G06N 3/048; G06N 3/0495; G06N 3/092; G06N 3/065; H03M 1/1215

See application file for complete search history.

(56) References Cited

U.S. PATENT DOCUMENTS 5,793,699 A  *  8/1998  Pascucci ................ G11C 8/18
                                                365/233.5
9,836,691 B1 * 12/2017  Narayanaswami .... G06N 3/063

OTHER PUBLICATIONS

Maharmeh Hamza Al et al: "A Comparative Analysis of Time-Domain and Digital-Domain Hardware Accelerators for Neural Networks", 2019 IEEE International Symposium on Circuits and Systems (ISCAS), IEEE, May 22, 2021 (May 22, 2021), pp. 1-5, XP033932368, ISSN: 2158-1525, DOI: 10.1109/ISCAS51556.2021.9401758.

(Continued)

*Primary Examiner* — Jean B Jeanglaude
(74) *Attorney, Agent, or Firm* — Fishman Stewart PLLC

(57) ABSTRACT

A spatially unrolled time domain (TD) architecture that includes an input and weight register having i inputs and j weights, where i corresponds with a number of delay lines for i neurons, and j corresponds with a number of processing elements (PEs) for each delay line of the i delay lines. An enable control register sends a global input pulse to i neurons, and each delay line of the i delay lines includes the corresponding j PEs for that delay line. Each PE includes a digital-to-time converter (DTC) that accepts a digital input and weight and generates a relative delay, each time delay within a given delay line contributing to an overall delay for the given delay line. i time-to-digital converters (TDCs). A readout register receives digital outputs from each of the i TDCs, and serially outputs a signal from each of the i delay lines based on the overall time delay for each of the i delay lines.

20 Claims, 14 Drawing Sheets

(51) Int. Cl.
G06F 1/08 (2006.01)
G06F 9/54 (2006.01)
H03M 7/00 (2006.01)

(56) References Cited

OTHER PUBLICATIONS

Everson Luke R et al: "An Energy-Efficient One-Shot Time-Based Neural Network Accelerator Employing Dynamic Threshold Error Correction in 65 nm," IEEE Journal of Solid-State Circuits, IEEE, USA, vol. 54, No. 10, Oct. 1, 2019 (Oct. 1, 2019), pp. 2777-2785, XP011747204, ISSN: 0018-9200, DOI: 10.1109/JSSC.2019.2914361.

Edwards Melvin D et al: "A Low-Power, Digitally-Controlled, Multi-Stable, CMOS Analog Memory Circuit", 2020 IEEE 63rd International Midwest Symposium on Circuits and Systems (MWSCAS), IEEE, Aug. 9, 2020 (Aug. 9, 2020), pp. 872-875, XP033819100, DOI: 10.1109/MWSCAS48704.2020.9184459.

Anonymous: "Technology—CMOS Laddered Inverter Ring Oscillator", Nov. 28, 2021 (Nov. 28, 2021), XP93098992, Retrieved from the Internet: URL:https://web.archive.org/web/2021112810 5416/ https://wayne.technologypublisher.com /technology/45146 [retrieved on Nov. 7, 2023].

Al Maharmeh Hamza et al: "Compute-in-Time for Deep Neural Network Accelerators: Challenges and Prospects", 2020 IEEE 63rd International Midwest Symposium on Circuits and Systems (MWSCAS), IEEE, Aug. 9, 2020 (Aug. 9, 2020), pp. 990-993, XP033819065, DOI: 10.1109/MWSCAS48704.2020.9184470.

International Search and Written Opinion, PCT/US2023/028974, dated Nov. 17, 2023.

D. Miyashita et al: "A Neuromorphic Chip Optimized for Deep Learning and CMOS Technology With Tun•• Domain Analog and Digital Mixed-Signal Processing" IEEE Journal of Solid-State Circuits (JSSC), Oct. 2017, vol. 52, No. 10, pp. 2679-2689.

J. Song et al., "TD-SRAM: Time-Domain-Based In-Memory Computing Macro for Binary Neural Networks," in IEEE Transactions on Circuits and Systems I: Regular Papers, Aug. 2021, vol. 68, No. 8, pp. 3377-3387.

Z. Chen et al., "A Time-Domain Computing Accelerated Image Recognition Processor With Efficient Time Encoding and Non-Linear Logic Operation," IEEE Journal of Solid-State Circuits (JSSC), Nov. 2019, vol. 54, No. 11, pp. 3226-3237.

M. Liu et al., "A scalable time-based integrat••and-fire neuromorphic core with brain-inspired leak and local lateral inhibition capabilities," in Proc. IEEE Custom Integr. Circuits Conf. (CICC), Austin, TX, USA, Apr./May 2017, pp. 1-4.

A. Sayal et al., "A 12.08-TOPS/W All-Digital Time-Domain CNN Engine Using Bi-Directional Memory Delay Line., for Energy Efficient Edge Computing," IEEE Journal of Solid-State Circuits, Jan. 2020, vol. 55, No. I, pp. 60-75.

A. Amaravati et al., "A 55-nm, t.0-0.4V, 1.25-pJ/MAC Tune-Domain Mixed-Signal Neuromorphic Accelerator With Stochastic Synapses for Reinforcement Learning in Autonomous Mobile Robots," IEEE Journal of Solid-State Circuits, Jan. 2019, vol. 54, pp. 75-87.

A. Gupta et al., "DDPMnet: All-Digital Pulse Density-Based DNN Architecture with 228 Gate Equivalents/MAC Unit, 28-TOPS/W and 1.5-TOPS/mm2 in 40nm," 2022 IEEE Custom Integrated Circuits Conference (CICC), 2022, pp. 1-2.

\* cited by examiner

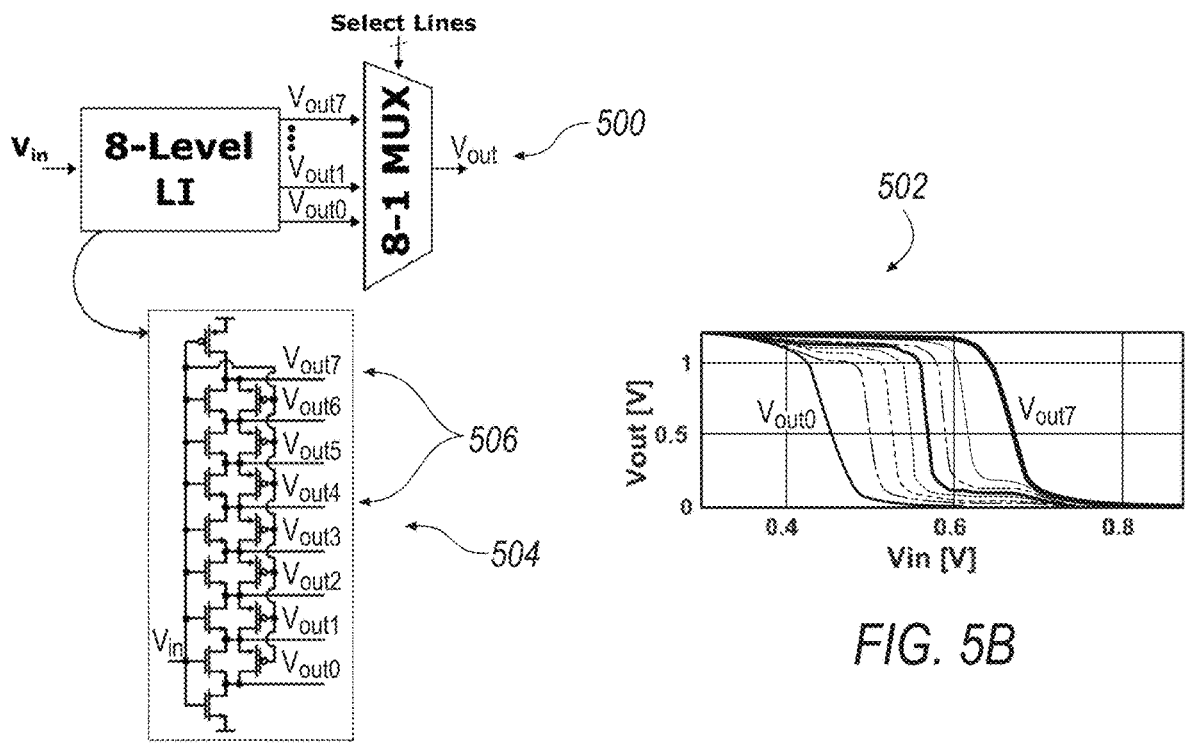
FIG. 5A
FIG. 5B
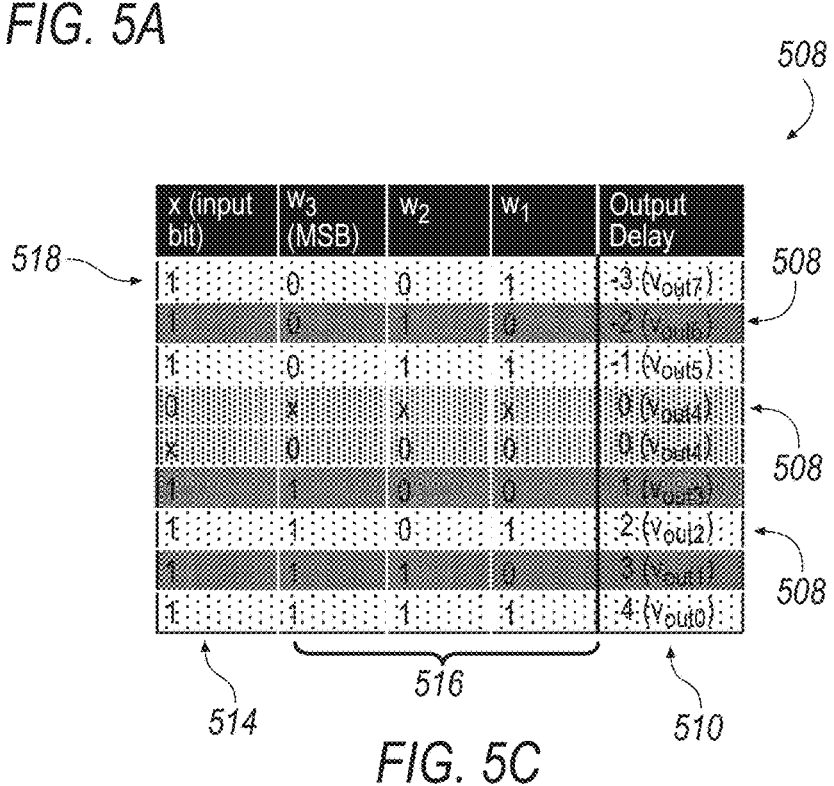
FIG. 5C

ENERGY EFFICIENT DIGITAL TO TIME CONVERTER (DTC) FOR EDGE COMPUTING

CROSS-REFERENCE TO RELATED APPLICATIONS

This application claims priority to U.S. Provisional Application No. 63/393,407 filed on Jul. 29, 2022, the contents of which are hereby incorporated by reference in their entirety.

FIELD OF TECHNOLOGY

This disclosure relates generally to a time-domain (TD) artificial neural network (ANN) that includes a digital-to-time (DTC) converter.

BACKGROUND

Deep Neural Networks (DNNs) have become a cornerstone for artificial intelligence (AI) applications due to an unprecedented accuracy in image classification, object recognition/detection, speech recognition, game playing, healthcare, and robotics, as examples. As DNNs include significant computational resources, energy, and memory bandwidth to process huge amounts of data with small latency and high accuracy, they are typically implemented on the cloud using graphic processing units (GPUs). Moving DNNs, however, out of the cloud and into the edge devices provides key benefits, including improving privacy in some applications, such as healthcare, and reducing latency, which is important in modern applications like autonomous driving. FIG. 1A shows basic mathematical operations for a DNN.

Over the last 50 years, Moore's law and Dennard scaling have helped build faster, smaller, and energy-efficient transistors, but this trend has slowed down due to the physical limits of the transistors. As such, various levels of research have built specialized computing hardware that can deliver high performance with high energy efficiency. Digital accelerators can be custom-made specifically for DNNs and thus can provide higher throughput, shorter latency, lower energy, and higher area efficiency.

Although digital accelerators provide better performance, conventional hardware implementation for Deep Learning (DL) uses GPUs to execute a vast number of multiply-accumulate (MAC) operations as shown in FIG. 1B which consume a tremendous amount of power that is not suited for energy-constrained devices.

To overcome fundamental challenges in digital systems, analog and mixed-signal hardware accelerators have been explored to build artificial neural networks (ANNs) that can outperform the digital-based ones by several orders of magnitudes in energy efficiency, computation, and training time. Analog processing has become more efficient than its digital counterparts, especially for DNNs, partly because emerging analog memory technologies have enabled local storage and processing as shown in FIG. 1C, thereby reducing the amount of data movement between the memory and the processor.

Although analog computation is efficient in terms of energy and area, it has limited accuracy and may not scale with CMOS technology. Additionally, the need for Analog-to-Digital converters (ADCs) and Digital-to-Analog converters (DACs) can limit the efficiency and scalability of the analog cores.

An emerging trend is to utilize time-domain (TD) to perform MAC operations by representing the data as pulses with modulation, and then to convert the result back to the digital domain, as depicted in FIG. 1D, which can be inefficient. TD cores use time-to-digital converters (TDCs) and digital-to-time converters (DTCs). However, DTC and TDC can be more energy and area efficient than DAC and ADC, respectively.

Thus, there is a need for an improved converter.

BRIEF SUMMARY

According to one aspect, a spatially unrolled time domain (TD) architecture includes an input and weight register having a matrix of i inputs and j weights, where i corresponds with a number of delay lines for i neurons, and j corresponds with a number of processing elements (PEs) for each delay line of the i delay lines, an enable control register for sending a global input pulse to i neurons, wherein each delay line of the i delay lines includes the corresponding j PEs for that delay line, wherein each PE includes a digital-to-time converter (DTC) that accepts a digital input and weight from the input and weight register, and generates a relative delay, each time delay within a given delay line contributing to an overall delay for the given delay line, a number of i time-to-digital converters (TDCs), each corresponding with a corresponding delay line and receiving an output from the corresponding delay line, and a readout register that receives digital outputs from each of the i TDCs, and serially outputs a signal from each of the i delay lines based on the overall time delay for each of the i delay lines.

According to another aspect, a method of mapping a series of time delays in edge computing, includes providing an input and weight register having a matrix of i inputs and j weights, where i corresponds with a number of delay lines for i neurons, and j corresponds with a number of processing elements (PEs) for each delay line of the i delay lines, providing an enable control register for sending a global input pulse to i neurons, wherein each delay line of the i delay lines includes the corresponding j PEs for that delay line, wherein each PE includes a digital-to-time converter (DTC) that accepts a digital input and weight from the input and weight register, and generates a relative delay, each time delay within a given delay line contributing to an overall delay for the given delay line, providing a number of i time-to-digital converters (TDCs), each corresponding with a corresponding delay line and receiving an output from the corresponding delay line, and providing a readout register that receives digital outputs from each of the i TDCs, and serially outputs a signal from each of the i delay lines based on the overall time delay for each of the i delay lines.

BRIEF DESCRIPTION OF THE DRAWINGS

FIG. 5A illustrates a 3-bit LI-DTC and 8-level schematic;

FIG. 5B illustrates an 8-level LI DC simulation;

FIG. 5C illustrates a delay mapping table corresponding to FIGS. 8A and 8B;

DETAILED DESCRIPTION

Figure 1A:
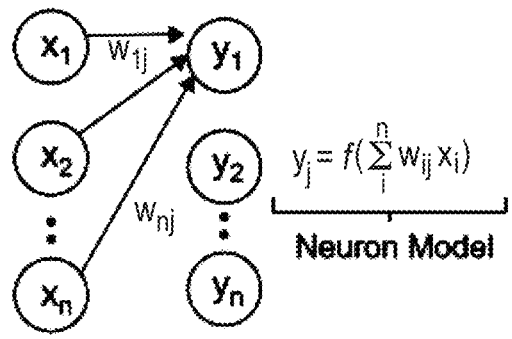
FIG. 1A shows basic mathematical operations for a DNN.
Figure 1B:
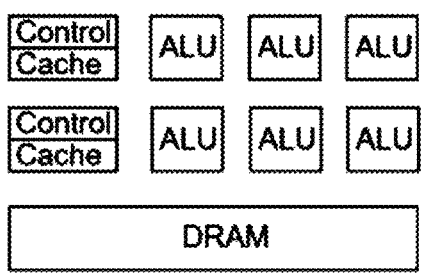
FIG. 1B shows a GPU architecture.
Figure 1C:
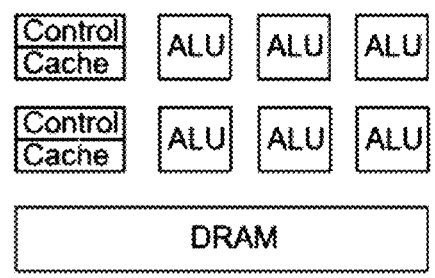
FIG. 1C shows an analog computation that enables local storage and processing.
Figure 1D:
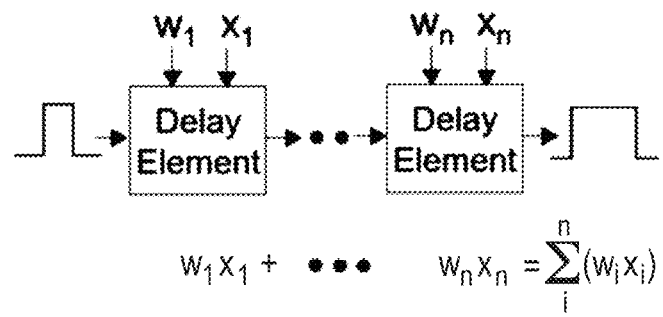
FIG. 1D shows use of time-domain (TD) computation to perform MAC operations.

According to the disclosure, in one example a spatially unrolled time-domain accelerator uses an ultra-low-power digital-to-time converter (DTC) while occupying an active area of 0.201 mm². The disclosed DTC is implemented using a laddered inverter (LI) circuit that consumes 3× less power than a conventional inverter-based DTC and provides reliable performance across different process corners, supply voltages, and temperature variations. Post-synthesis results in 65 nm CMOS show that the disclosed core achieves a superior energy efficiency of 116 TOPS/W (trillions or tera operations per second/watt) throughput of 4 GOPS (giga operations per second), and area efficiency of 20 GOPS/mm². In one example, the disclosed core improves energy efficiency by 2.4-47× compared to prior time-domain accelerators.

The disclosure is summarized as follows. First, a disclosed efficient DTC circuit consumes 3× less power than the inverter-based DTC. Second, a spatially unrolled TD core synthesized in 65 nm CMOS technology is implemented that uses the disclosed DTC and achieves an exemplary energy efficiency of 116 TOPS/W for 1-bit inputs and 3-bit weights, which has improved by 2.4-47× compared one known prior effort while occupying a small active area of 0.201 mm2. Previously implemented inverter-based DTC TD core and digital core are compared using the same architecture and technology presented in a known device, against the disclosed TD accelerator. Lastly, we present a detailed analysis of the results by comparing the performance of the disclosed architecture in terms of throughput, power consumption, area, and energy efficiency.

Section II introduces TD computation and discusses some TD known implementations. Section III presents the disclosed TD accelerator, including the disclosed DTC circuit. Section IV analyzes and compares the implementation results of the disclosed core.

II. Time-Based ANNs Taxonomy

A. Digital vs. Analog vs. Time-Domain Architectures

In the digital approach, data are represented as a multi-bit digital vector, where MAC operations can be performed using multipliers and adders. Therefore, the digital implementation offers great scalability. However, increasing the number of input bits results in high switching power consumption, especially for accessing memory, and large area overhead. In the analog domain, data are represented as a continuously varying voltage signal. Some known analog-based accelerators implement MAC operations using charge manipulation schemes and ADCs. In these approaches, input pixel data are either encoded as a pulse-width-modulation (PWM) signal or as a pulse-amplitude-modulated (PAM) signal. The MAC operation is performed by summing the read current of simultaneously accessed bit-cells. The analog approach is susceptible to process variation, noise, bit-flips, and weak line corruption. Although analog computations are efficient in terms of energy (OPS/W) and area (OPS/mm²), they may be limited in terms of accuracy and technology scaling. Additionally, the lack of capable commercially available nonvolatile analog memory can limit the usage of analog cores.

The data in the TD are represented as a pulse with modulation or other time-domain representations such as pulse density. The TD approach combines the advantages of the digital and analog approaches, technology scalability and energy-efficient computation. In addition, unlike the analog-based computation, which includes the use of an analog circuit design flow, TD circuits can utilize the digital IC design flow, thereby enabling large-scale integration. Previous works show that TD cores can surpass digital implementations of ANN if the number of input bits is relatively low (<6 bits). In TD ANN, calibration is necessary because of the analog nature of the delay signal which is more prone to noise and process variation. Moreover, the TD approach includes additional TDCs and DTCs, but DTC and TDC are still more energy- and area-efficient than DAC and ADC. TD computing is better suited for applications that include low/medium input/weight bit resolution and have stringent power requirements, such as edge devices, which in one example is a distributed information technology (IT) architecture in which data is processed at the periphery of a network, as close to the originating source as possible. Phase-domain (PD) ANN is similar to TD, but it utilizes the phase shift to implement the dot product. One issue with the PD approach is that it includes multiple clock sources. Additionally, the toggling activity depends on the input magnitude. Table I summarizes each approach[1].

[1]Area is dominated by the peripherals of the analog core (ADCs and DCAs)

TABLE I

COMPARING DIFFERENT ACCELERATORS

| Approach | Digital | Analog | Time |
|---|---|---|---|
| Data Representation | Multi-bit digital vector | Continuous voltage signal | Pulse with modulation |
| Technology Scaling | Yes | No | Yes |
| Immunity to Noise | High | Low/Moderate | Moderate |
| Input Resolution | High | Low/Moderate | Low/Moderate |

TABLE I-continued

COMPARING DIFFERENT ACCELERATORS

| Energy Efficiency | Low/Moderate | Very High | High |
|---|---|---|---|
| Throughput | High | Very High | Moderate |
| Area | Moderate | Moderate/Large[1] | Moderate/Large |

B. Time-Domain Implementations

Figure 2A:
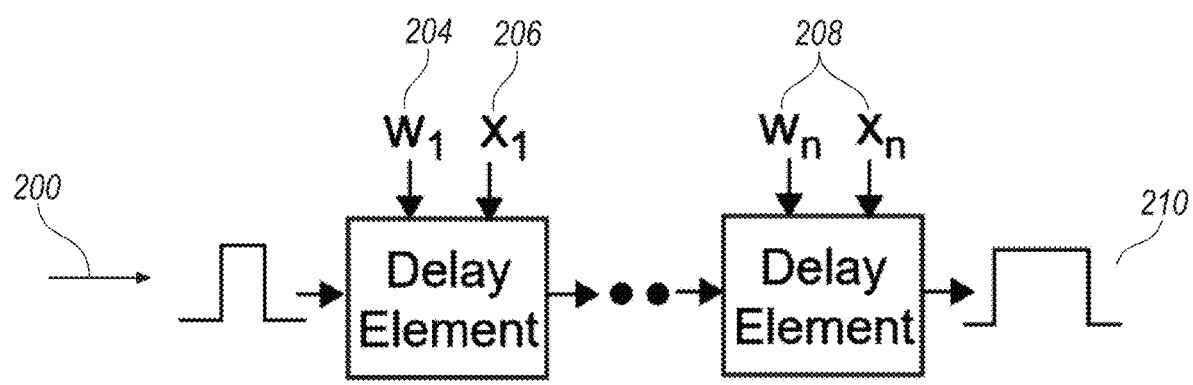
FIG. 2A illustrates a spatially unrolled TD architecture.
Figure 2B:
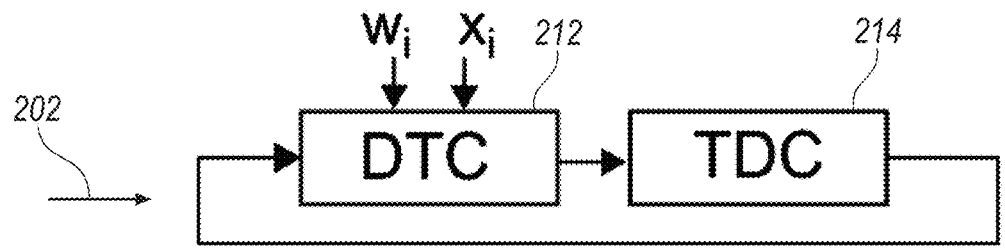
FIG. 2B illustrates a recursive TD architecture.

TD ANN cores can be implemented using two different architectures, namely spatially unrolled (SU) 200 and recursive (REC) 202. In the SU architecture 200, weights 204 and inputs 206 are stored in spatially distributed storage elements with a dedicated processing element (PE) 307. Thus, N 208 of DTCs are used for N 208 input neurons, as shown in FIG. 2A. Although SU 200 uses many DTC and TDC blocks, the summation 210 comes without further cost, as the pulse propagates through the delay elements. FIG. 2B shows the recursive architecture 202, which reuses the same DTC 212 and TDC 214 blocks to perform each MAC, thereby reducing the chip area. SU 200 is relatively fast, but it is area-inefficient when it comes to scaling the number of input bits. As such, SU 200 is limited to low-resolution inputs/weights. In contrast, REC 202 is relatively slow, as each input is fed serially to a DTC 212, then to a time register/counter 214 every clock cycle. However, it is easier to scale the design since multi-bit digital inputs can be represented in PWM.

Some TD signal processing techniques have been previously implemented, including shared time generator, median filter (MF), and winner-take-all (WTA) circuits. The MAC is performed in the digital domain, while WTA and MF are implemented in TD. The implementation of WTA and MF includes TD arithmetic, such as min., max., compare, and add using a NAND gate, a NOR gate, 2 NAND gates, and a series of inverters with variable delay, respectively. The generated feature vector is classified by a WTA classifier. Comparison results are then converted back to digital to find the final winner. One disadvantage of this approach is that the only parts that are related to TD computation are the MF and WTA, and it includes a 4× conversion time from digital-to-time and then time-to-digital. And, the power consumption is 75 mW which is relatively high compared with other TD implementations.

1) Spatially Unrolled Architecture:

In one example, a digitally controlled oscillator (DCO) modulates the frequency by switching capacitor loads representing the weights, while the number of cycles is counted during a fixed sampling period. Each input stage of the DCO includes an inverter and binary-weighted MOSFET capacitors controlled by an input pixel and a 3-bit weight, which are stored in SRAM cells. Input pixels determine whether a stage is activated, while the weights determine how many capacitors are loading that stage. Delay of all stages accumulates naturally in the DCO loop and is modulated to an oscillation frequency, which is fed to an 8-bit counter. The counter increments every DCO cycle, and when the counter value reaches a specific count, a spike is generated and the counter self-resets. One drawback of such an arrangement can be summarized as follows: (1) The DCO oscillates for many cycles to generate a reliable result; (2) Since many DCOs are used, a calibration is used to reduce the mismatch among the DCOs; (3) The use of binary-weighted capacitors makes the design sensitive to parasitic capacitance and increases the chip area; and (4) Continuously running oscillators increase the power consumption.

In one approach based on delay lines, outputs and weights are restricted to binary. The design in this approach uses the time difference of rising edges of two nodes to represent a value. The polarity is considered by monitoring which edge arrives first. The weights control the multiplication result, whether it is negative or positive, using a variable resistor. Hence, the disclosed PE includes a series of inverters and two variable resistors. Binary-weighted NMOS transistors are used as variable resistors. One drawback of this design is that the outputs and weights are restricted to binary. Besides, the design has double the area overhead because it uses local reference delay lines instead of a global reference.

In one implementation, a TD core using one-shot delay and an error correction technique is presented. A chain of variable delay elements is cascaded, where each element has a delay value that depends on the product of the input and the weight. An input pulse is applied at the first element, where the output pulse width will eventually represent the MAC operation needed for the neuron. A low-resolution 2-bit TDC is used to convert the analog signal into digital and also to implement a rectified linear unit (ReLU) simultaneously. Then, to perform the computation of the second layer, the digital output of TDC is encoded in a thermometer code. Disadvantages of this work can be summarized as follows. First, the one-hot encoding of 3-bit weights into 8-bit is generally necessary because the used digitally controlled delay cell. Therefore, eight SRAM cells are used to represent each 3-bit weight. Furthermore, the accelerator works with only binary input. Lastly, the use of error correction technique can result in more than 51% of the time and power overhead.

In one implementation, an in-memory computing (IMC) TD core is presented where a time-domain 6T SRAM cell is implemented for storing and processing data. The reported work achieves superior energy efficiency; however, it supports only binary operations. Additionally, the reported accelerator works at an extremely low frequency which is at least 11× less than other SU-TD cores.

2) Recursive Architecture (REC):

In one system, a TD convolutional neural network (CNN) core using bi-directional memory delay lines is implemented. The digital inputs are sequentially encoded as PWM signals using a DTC. Then, the time signal is multiplied by the corresponding weight bit using an AND gate. Subsequently, these pulses are sent to a time register to add them up. Finally, an up-down counter is used to convert the resultant MAC signal into a digital value. Although this approach supports multi-bit resolution for the inputs (weights are binary), it results in lower throughput due to its sequential operation, In another implementation, a TD accelerator with reinforcement learning is used by a mobile robot to avoid obstacles. Inputs come from ultrasonic sensors and they are represented in TD as an 8-bit delay pulse. Output is a control message sent to a Raspberry PI (e.g., a low cost, small computer, the size of a credit card, that plugs into a computer monitor or television, and uses a standard keyboard and mouse), which in turn sends the control command to the motor controllers. The MAC operations are computed in TD and accumulated in a 15-bit counter. A digital word, which includes the first seven most significant bits (MSBs) of the counter, is fed to a digital-to-pulse converter (DPC), which also implements a ReLU Weights are represented in 6-bit signed-magnitude format. An input pulse controls the select bit of the multiplexing (MUX) and it is also used as the counter enable signal. One drawback of this approach is the use of a DCO, which needs settling time and needs to count for a long time to have the correct output. Also, the enable signal for the counter and the local DCO clock are asynchronous which can lead to a 1 least-significant bit (LSB) error. Additionally, generating 32 frequencies for the DCO will result in many issues related to linearity and calibration.

Another TD-REC approach is implemented where the presented neuron includes a MUX and a counter. This work eliminates the need for a DCO by representing the inputs in pulse density. The weights control the enable signal for the counter and determine whether to count up or down based on the sign bit. However, since this work follows the REC approach, the operating frequency and throughput are very limited.

III. Disclosed Time-Domain Core

Figure 3:
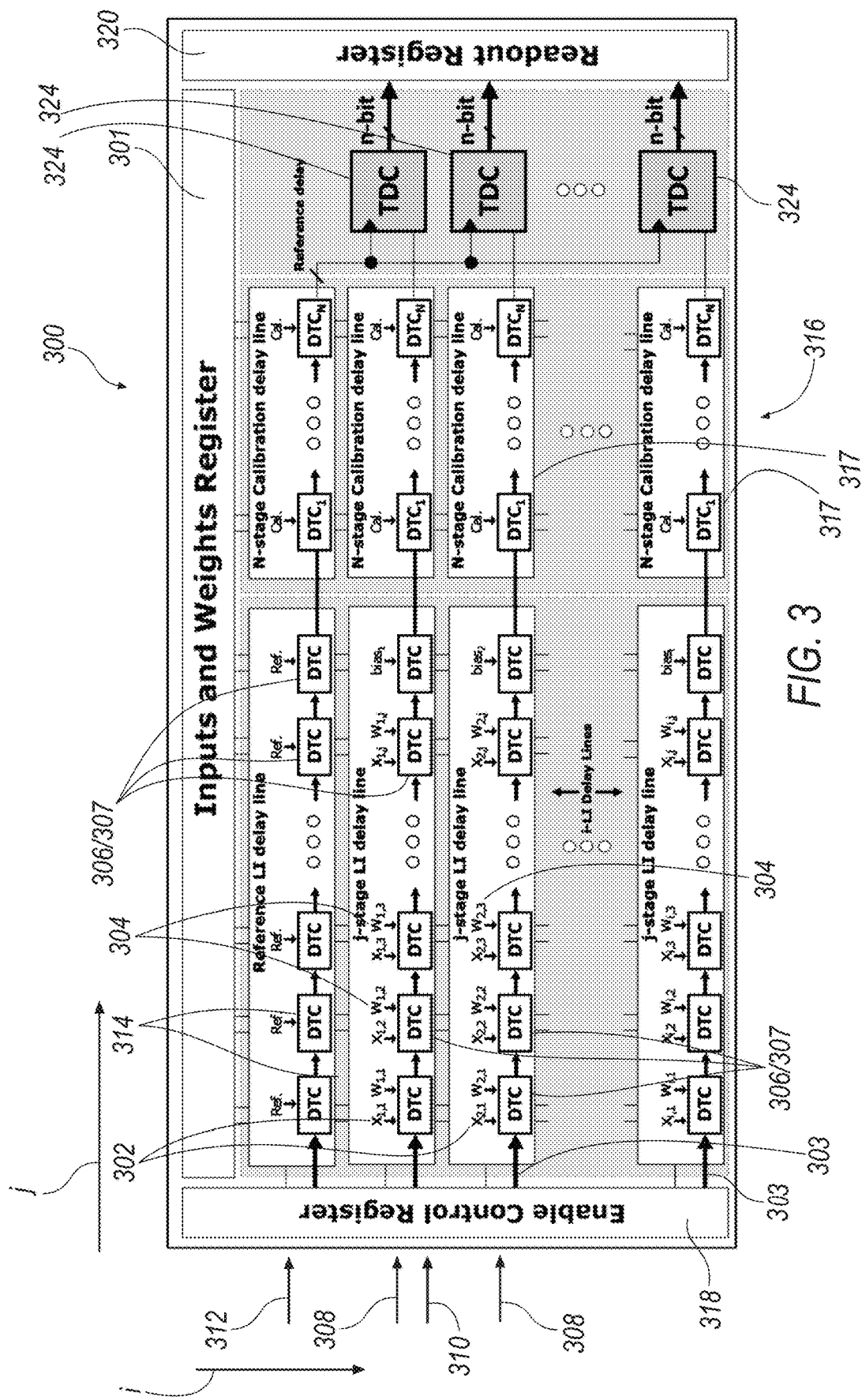
FIG. 3 illustrates the disclosed time-domain architecture.

FIG. 3 shows the disclosed spatially unrolled TD architecture 300. Inputs 302 and weights 304 are stored in an input and weight register 301 in the digital domain, where each input and weight pair (302/304) pertaining to each DTC 306 is connected to the corresponding PE 307. Input and weight register 301 includes a matrix of i inputs and j weights, where i corresponds with a number of delay lines for i neurons, and j corresponds with a number of processing elements (PEs) for each delay line of the i delay lines. The disclosed core follows the SU implementation, thus, j number of PEs is used for j inputs per neuron. Each delay line 308 of the i delay lines 308 represents a neuron that includes cascaded PEs 310. Each PE 307 is a DTC 306 that accepts the digital input 302 and weight 304, and then generates a relative delay that can be mapped to the result of the dot product of inputs and weights. The number of bits for the inputs and weights will determine the resolution needed for the DTC. The DTC 306 utilizes a laddered inverter (LI) circuit that will be discussed further, and as illustrated and described with respect to FIGS. 4A through 4C.

For the disclosed accelerator, the inputs are binary, and the weights are represented in 3-bit. In one example, a 4-bit DTC is used to cover all the cases. However, since the input is binary, the DTC can be reduced to 3-bit only. Thus, the DTC generates 8 different delays. The core has a global reference delay line 312 used to generate reference delays 314 for the TDCs. The reference delay line is the same as a regular delay line, but each PE is fed with a fixed reference input. The number of needed delays depends on the resolution of the TDC. As the resolution increases, the result will be better, but at the expense of area and complexity. The used TDC is a 4-bit thermometer code that compares the arrival time of a neuron output to 4 reference delay signals. As shown in FIG. 3, in the illustrated example a calibration stage 316 is added, each having a corresponding calibration delay line 317 to account for process and temperature variations by tuning each of the i output delays.

For the disclosed SU TD accelerator 300, i input pulses 303 are sent to each corresponding delay line 308, such that each line will add a delay to the input pulse equal to the sum of the dot product of inputs and weights. The dot product is equal to the resultant delay generated by the DTCs 306, and the product terms can be added as the pulse propagates through the PEs 308. An enable control register 318 is responsible for sending a global input pulse to each neuron and the reference neuron. Enable control register 318 sends a global input pulse to i neurons, wherein each delay line of the i delay lines includes the corresponding j PEs for that delay line, wherein each PE includes a digital-to-time converter (DTC) that accepts a digital input and weight from the input and weight register 301.

At the output end of each delay line 308, i TDCs 324 correspond to each delay line 308 and includes processing from global reference delay line 312, TDCs 324 output time delay digital outputs to a readout register 320. Thus, it is also responsible for sending synchronized pulses for multi-layer ANNs where the pulses are sent in order with sufficient processing time, due to the shifting delays in each delay line 308, as further illustrated in FIG. 5B and FIGS. 7A and 7B. Finally, once the outputs of the TDCs are ready, readout register 320 is then used to read the final output serially.

A. Disclosed Digital to Time converter (DTC)—LI Circuit

Figures 4A, 4B:
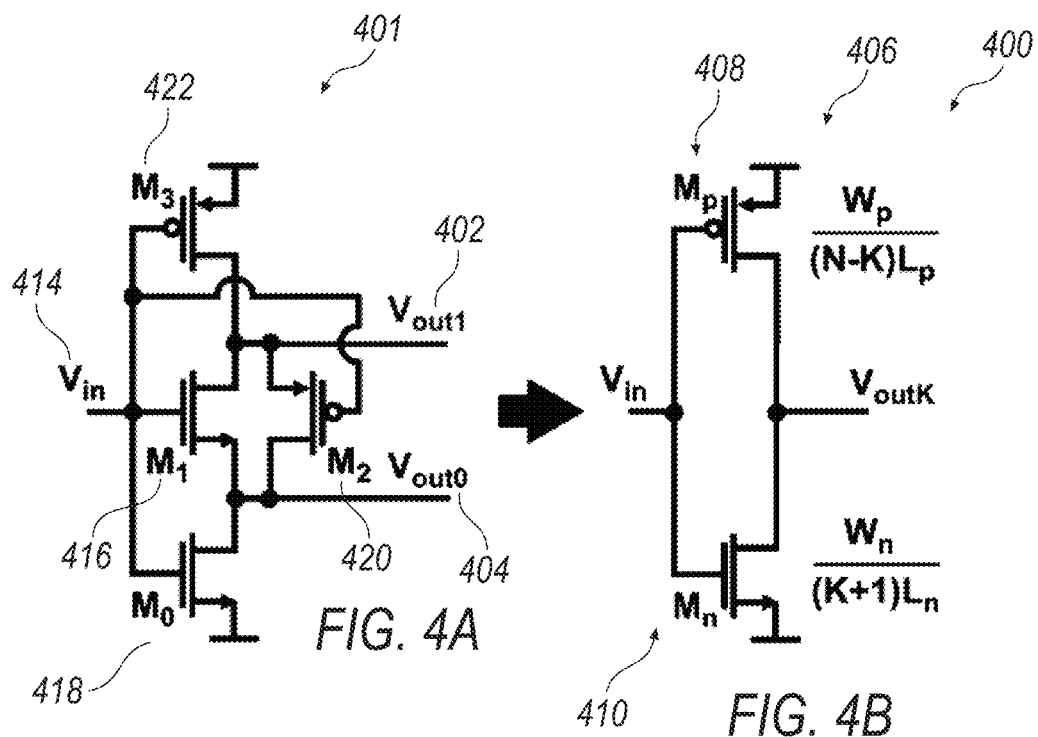
FIG. 4A illustrates basic principles of a two-output LI circuit.
FIG. 4B illustrates the circuit of FIG. 4A in a simplified and equivalent illustration.

The disclosed DTC utilizes a laddered inverter (LI) circuit 401. To analyze the LI circuit, consider the simplified structure 400 shown in FIG. 4A, in which only two output levels 402, 404 are implemented. As depicted in FIG. 4B, the circuit can be simplified 406 as a combination of two complementary metal-oxide semiconductor (CMOS) inverters 408, 410 that have different ratios of n-channel metal-oxide semiconductor (NMOS) versus p-channel metal-oxide semiconductor (PMOS) gate lengths, thereby resulting in the shifted DC characteristics 412 shown in FIG. 4C. When $V_{in}$ 414 is low and both outputs 402, 404 are high, transistor $M_1$ 416 is inactive such that $V_{out0}$ 404 transitions with increasing $V_{in}$ 414 according to a CMOS inverter characteristic with one NMOS device, $M_0$ 418, and two series PMOS devices, $M_2$ 420 and $M_3$ 422. In contrast, when $V_{in}$ 414 is high and both outputs 402, 404 are low, $M_2$ 420 is inactive such that $V_{out1}$ 402 transitions with decreasing $V_{in}$ 414 according to a CMOS inverter characteristic with two series NMOS, $M_0$ 418 and $M_1$ 420, devices and one PMOS device, $M_3$ 422. Since $V_{out0}$ 404 cannot go high unless $V_{out1}$ 402 is also high, and $V_{out1}$ 402 cannot transition low unless $V_{out0}$ 420 is also low, the LI circuit 400 provides guaranteed monotonicity in the quantizer characteristic regardless of a mismatch. Note that one should not confuse the curves 412 shown in FIG. 4C with the phenomenon of hysteresis—they instead correspond to the DC characteristic that is independent of the previous state of the input.

Figure 4C:
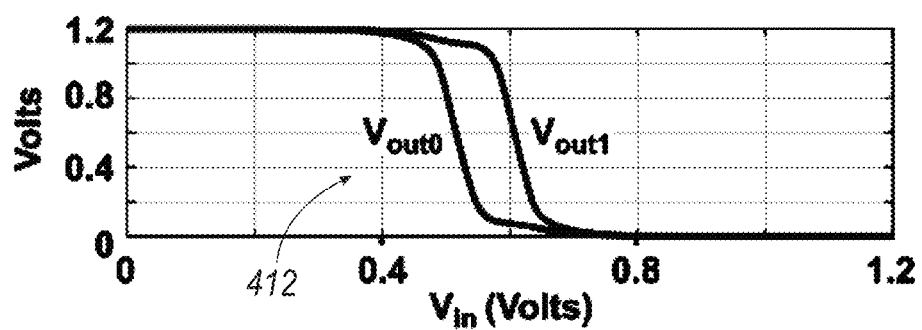
FIG. 4C illustrates exemplary DC characteristics of the circuit of FIG. 4A.

As shown in FIG. 5A, eight outputs 502 are achieved by using an eight-output LI circuit 504, each LI circuit 506 as illustrated with respect to the discussion of FIGS. 4A-4C. Note that increasing the number of stable operating points may not lead to a proportional increase in the electric current since all of the devices share the same current. As a result, LI-DTC achieves superior energy efficiency. It is worth mentioning that, more LI circuits can be stacked if more output levels are needed, which as a result can be mapped to a higher resolution.

FIG. 5B shows the DC characteristic of $V_{in}$ for the 8-level LI circuit 500 shown in FIG. 5A, at 1.2 V supply voltage. In FIG. 5C, the delay mapping table shows each delay line 508 and its corresponding equivalent digital value 510. The table 512 presents the mapped values for 1-bit inputs 514 and 3-bit weights 516. In one example, a 4-bit DTC is used to cover all the cases, however, since the input is binary, then the DTC resolution can be reduced to 3-bit only. Thus, the DTC generates 8 different delays, shown in the 8 delay signals or outputs 502 and 510. The delays 510 are mapped such that the most positive number 518 corresponds to the fastest delay while the most negative number is mapped to the slowest delay. If the nonlinearity in the first and last delays $V_{out(0)}$ and $V_{out(7)}$ impacts the result, one can ignore them, and only consider the middle delay lines. Thus, the various delays illustrated in FIG. 5B, starting with $V_{out(0)}$ and $V_{out(7)}$ are mapped accordingly as in table 512 of FIG. 5C.

Figure 6:
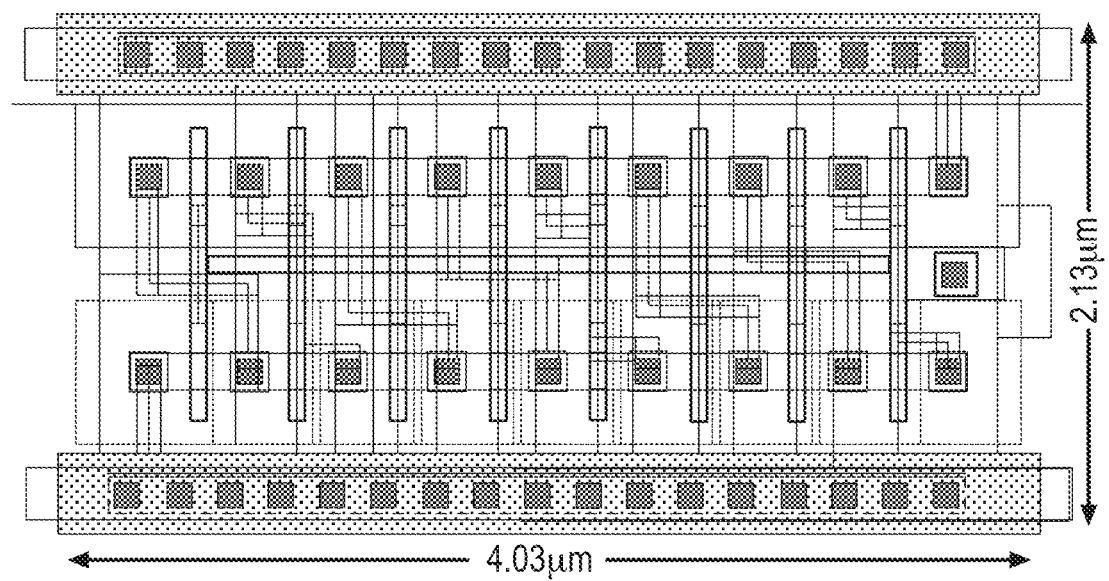
FIG. 6 illustrates an exemplary 8-level LI layout according to the disclosure.

The monotonicity of LI outputs and low power operation make LI circuit an excellent candidate for DTC implementation in time-domain ANNs, while occupying small active area. An eight-output LI layout is shown in FIG. 6, where its area is approximately 8.58 µm². To enable very large integration, the disclosed LI circuit is migrated to digital flow. This can be done by characterizing the LI circuit using, for instance, Cadence Liberate tool, which will generate the needed library files that contain information about the power consumption, delays, parasitics, and all other parameters.

Figure 7A:
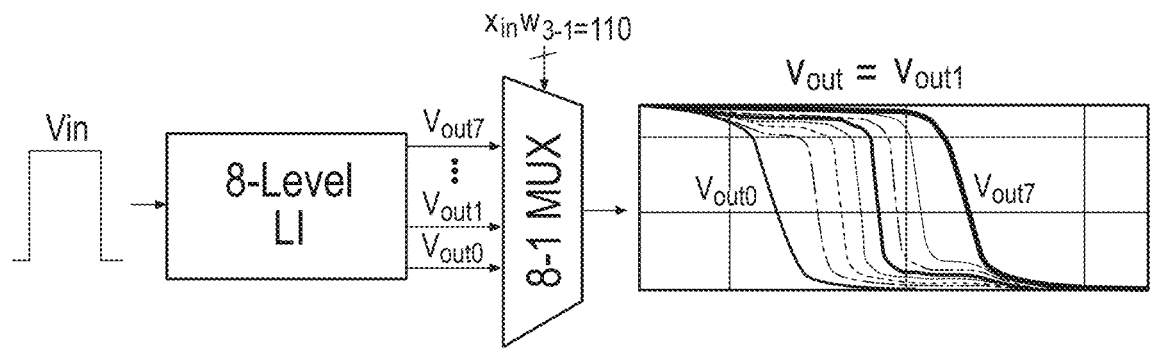
FIG. 7A illustrates an exemplary LI-DTC output when $\{x_{in}, w_{3-1}\}=1110$.
Figure 7B:
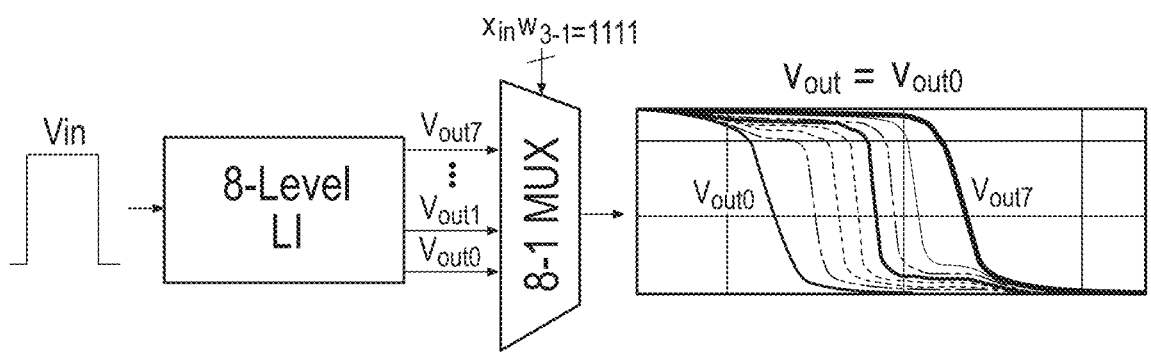
FIG. 7B illustrates an exemplary LI-DTC output when $\{x_{in}, w_{3-1}\}=1111$.

By having an 8-1 Multiplexer (MUX) that selects one of the eight LI outputs based on the input and weight bits, then a 3-bit LI-DTC can be implemented, as shown in FIG. 5A. FIG. 7A demonstrates an example of LI-DTC output when MUX select lines are equal to 1110. In this case, the second-fastest delay line will be selected for the output. If the select lines are equal to 1111, then the fastest delay will be passed to the output, as depicted in FIG. 7B.

B. Time to Digital Converter (TDC)—Phase Generator

Figure 8A:
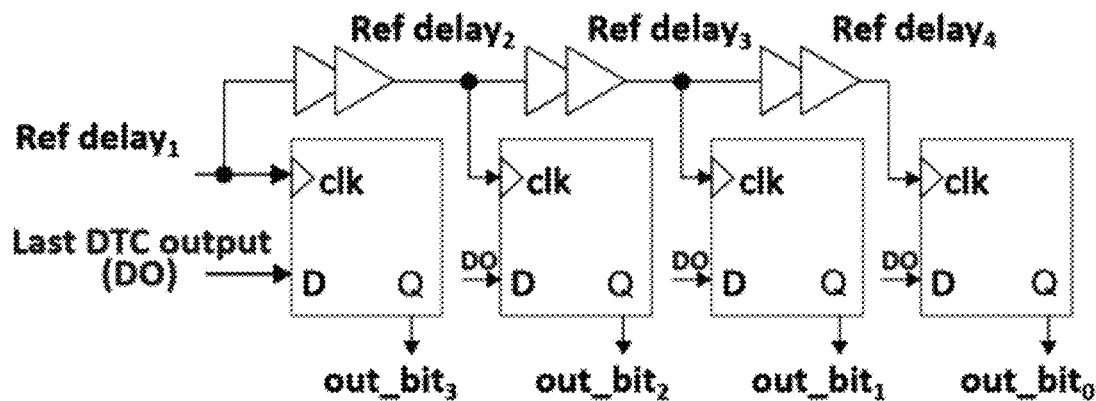
FIG. 8A illustrates an exemplary 4-bit thermometer TDC schematic.
Figure 8B:
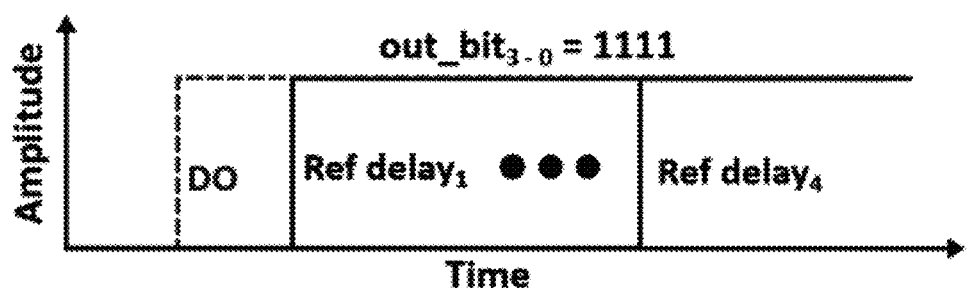
FIG. 8B illustrates an exemplary case when TDC output=1111.
Figure 8C:
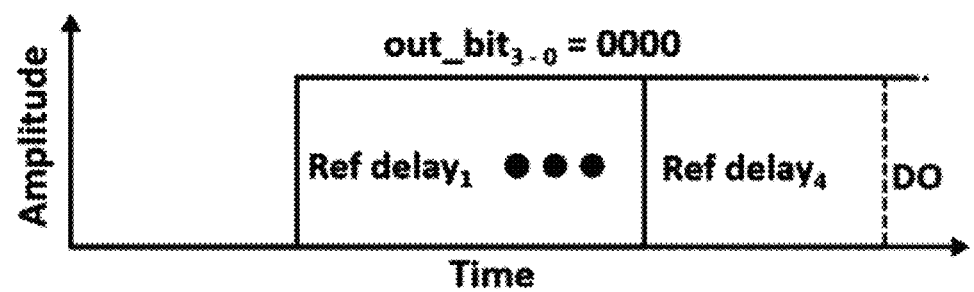
FIG. 8C illustrates an exemplary case when TDC output=0000.

A 4-bit thermometer code TDC is used to convert the delay signal into digital and implements ReLU. The TDC is a phase w detector that will compare the arrival time between 4 reference edges and the neuron output, as shown in FIG. 8B. The reference edges come from a reference delay line that may be identical to a regular neuron delay line but with zero inputs. If the neuron output arrives before the fastest reference edge, then all the 4-bits are ones as shown in FIG. 8B, and if the output arrives after the slowest reference edge, the output will be zero, as illustrated in FIG. 8C.

Thus, according to aspect, a spatially unrolled time domain (TD) architecture includes an input and weight register having a matrix of i inputs and j weights, where i corresponds with a number of delay lines for i neurons, and j corresponds with a number of processing elements (PEs) for each delay line of the i delay lines, an enable control register for sending a global input pulse to i neurons, wherein each delay line of the i delay lines includes the corresponding j PEs for that delay line, wherein each PE includes a digital-to-time converter (DTC) that accepts a digital input and weight from the input and weight register, and generates a relative delay, each time delay within a given delay line contributing to an overall delay for the given delay line, a number of i time-to-digital converters (TDCs), each corresponding with a corresponding delay line and receiving an output from the corresponding delay line, and a readout register that receives digital outputs from each of the i TDCs, and serially outputs a signal from each of the i delay lines based on the overall time delay for each of the i delay lines.

According to another aspect, a method of mapping a series of time delays in a deep neural network (DNN), includes providing an input and weight register having a matrix of i inputs and j weights, where i corresponds with a number of delay lines for i neurons, and j corresponds with a number of processing elements (PEs) for each delay line of the i delay lines, providing an enable control register for sending a global input pulse to i neurons, wherein each delay line of the i delay lines includes the corresponding j PEs for that delay line, wherein each PE includes a digital-to-time converter (DTC) that accepts a digital input and weight from the input and weight register, and generates a relative delay, each time delay within a given delay line contributing to an overall delay for the given delay line, providing a number of i time-to-digital converters (TDCs), each corresponding with a corresponding delay line and receiving an output from the corresponding delay line, and providing a readout register that receives digital outputs from each of the i TDCs, and serially outputs a signal from each of the i delay lines based on the overall time delay for each of the i delay lines.

IV. Results and Analysis

A. U-DTC Characterization

Figure 9:
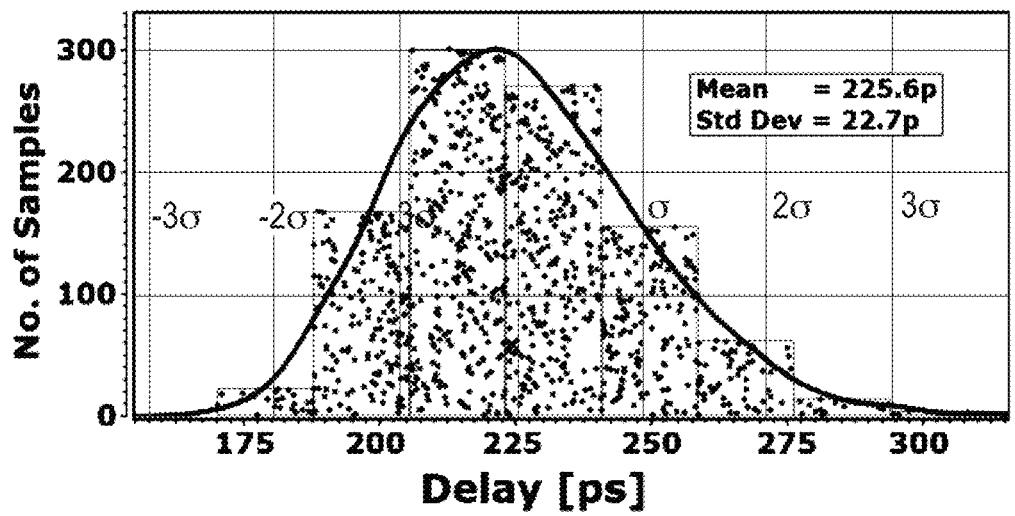
FIG. 9 illustrates an exemplary Monte Carlo simulation.
Figure 10:
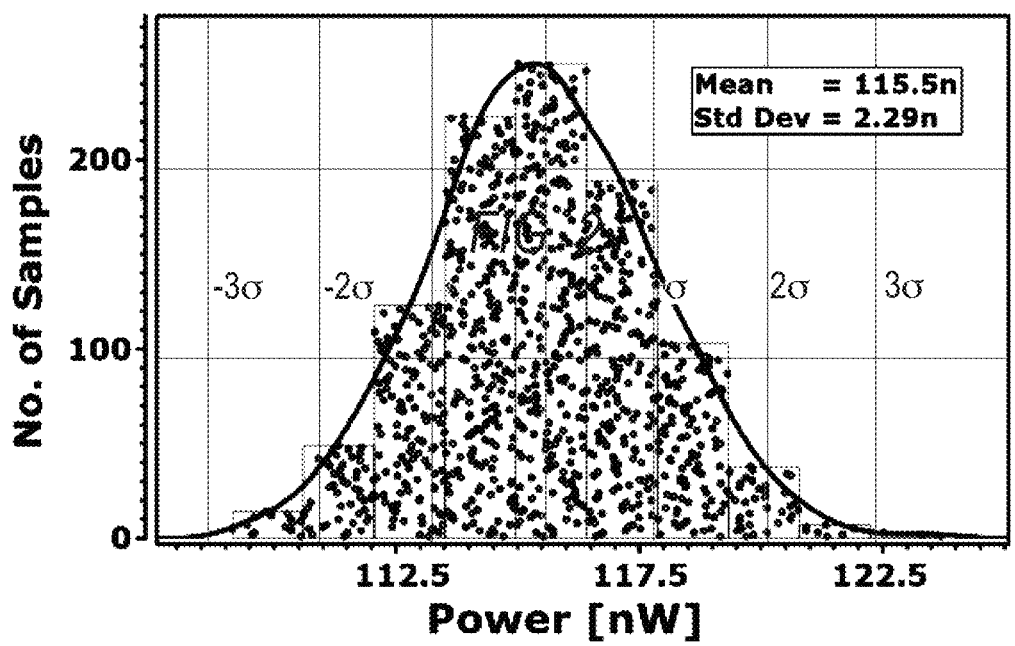
FIG. 10 illustrates an exemplary Monte Carlo simulation.
Figure 11:
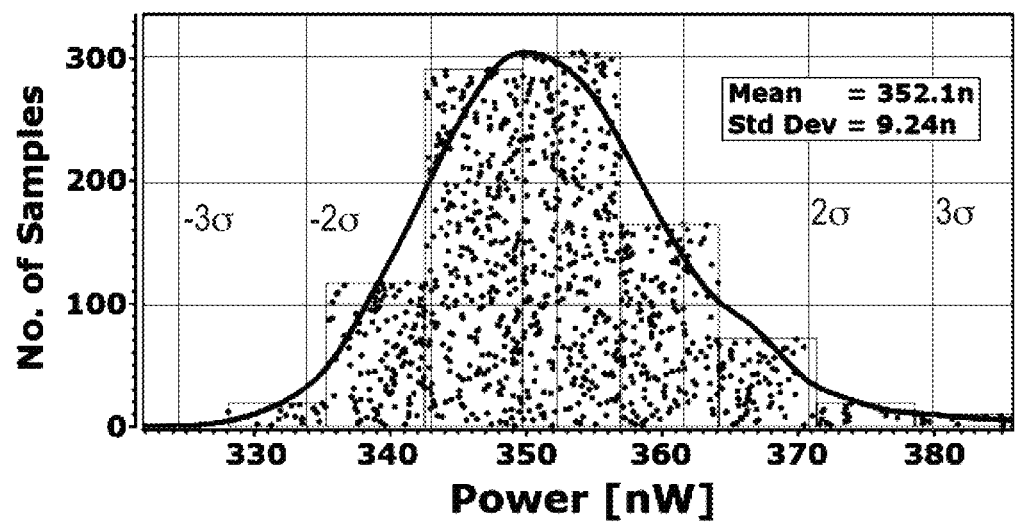
FIG. 11 illustrates an exemplary Monte Carlo simulation.

To demonstrate the advantage of the disclosed LI-DTC, the disclosed circuit is compared against an inverter-based DTC. Both DTCs are designed using the same technology with minimum sizes and 8 delay levels. FIG. 9 shows a 1000 points Monte Carlo simulation for the LI circuit of the reference delay. The reference delay line is considered to be the delay that is mapped to logic '0'. The mean delay is 225.6 ps which corresponds to 4.43 GHz frequency. This result can deviate by ±0.4 GHz FIG. 10 shows an exemplary 1000 points Monte Carlo simulation of the power consumption for the LI-DTC at 1.2 V and 25° C. The power consumption is measured when an input signal with go ns period is applied. The average power consumption of the LI circuit is 115.5 nW with an extremely low deviation of 2.29 nW. This is mainly due to the stacking nature of the LI circuit which makes it superior to the inverter-based DTC where the power consumption and deviation are much higher, as shown in FIG. 11.

Figure 12:
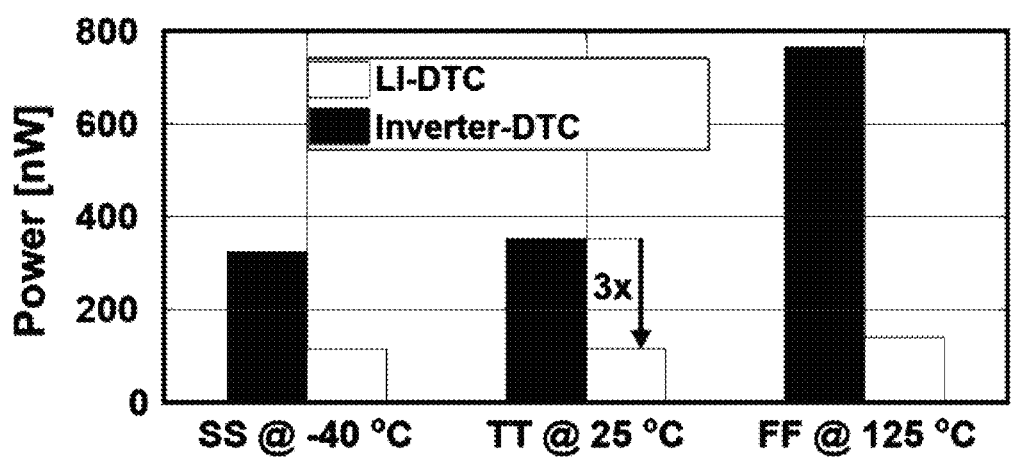
FIG. 12 illustrates exemplary LI vs. inverter based DTC power consumption.

FIG. 12 presents exemplary power consumption of LI-DTC and inverter-based DTC across different process corners and temperatures. At room temperature and typical corner, LI-DTC consumes 3× less power. Additionally, LI-DTC shows almost consistent performance across all the corners and temperatures with minimal deviation. This is important for time domain accelerators as it can lead to relaxation in calibration and tuning stages. These figures demonstrate the excellent robustness of the disclosed circuit across process and temperature variations. Also, the reported results show that LI-DTC is a well-suited candidate for TD cores.

B. LI-Based TD ANN Results

Figure 13A:
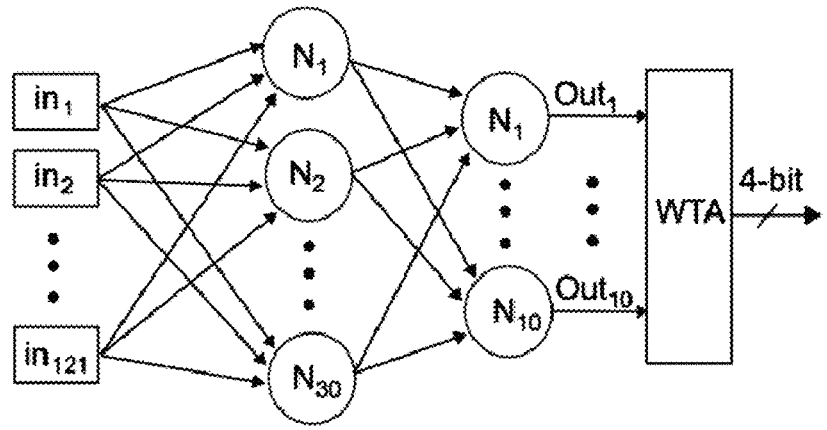
FIG. 13A illustrates the disclosed ANN.
Figure 13B:
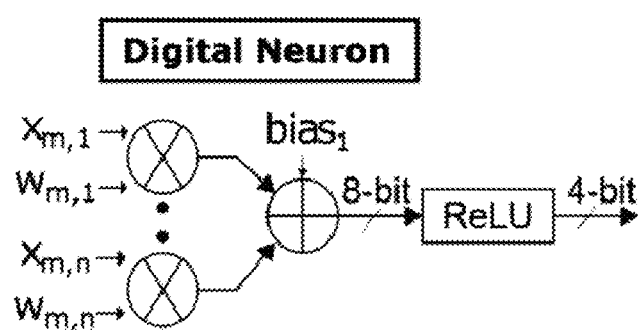
FIG. 13B illustrates implementation of a digital neuron.

The performance of the disclosed time-domain core is evaluated using the known MNIST dataset, which includes grayscale 28×28 pixel images. The images are handwritten digits from 0-9, and the comparison is based on the classification accuracy. The images are binarized, crop 3 pixels from each side, and resize the images to 11×11 pixels. The neural network has 121 inputs, 30 hidden neurons, and 10 output neurons, and winner-take-all (WTA) is used to find the final output, as shown in FIG. 13A. The network is trained in MATLAB, and quantized 3-bit weights from −3 to 4 are used for inference. The same digital core is implemented using the same technology for comparative purposes, where it has 1-bit inputs, and 3-bit signed weights ranging from −3 to 4. In the hidden neuron, each input is multiplied by its weight, and the product terms are added and stored in an 8-bit register. A ReLU is then used, which outputs the 4 most significant bits (MSBs) of the previous neuron output, as shown in FIG. 13B. The output neuron is identical to the hidden neuron, but implements 4-bit MAC. Finally, WTA function is utilized to select the maximum output among the 10 outputs from the output layer. The digital core is synthesized using 65 nm standard cells with 1.2 V supply voltage.

Figure 13C:
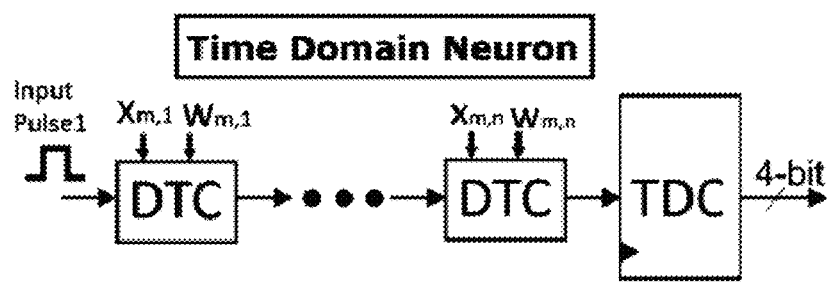
FIG. 13C illustrates implementation of a TD neuron.

For the TD core, the disclosed LI-DTC is characterized by using Cadence Liberate tool to use it in the digital flow. After that, the TD core is synthesized using 65 nm standard cells with 1.2 V supply voltage. FIG. 13(c) shows the time domain neuron where it has 121 LI-DTCs each with binary input and 3-bit weight.

Figure 14:
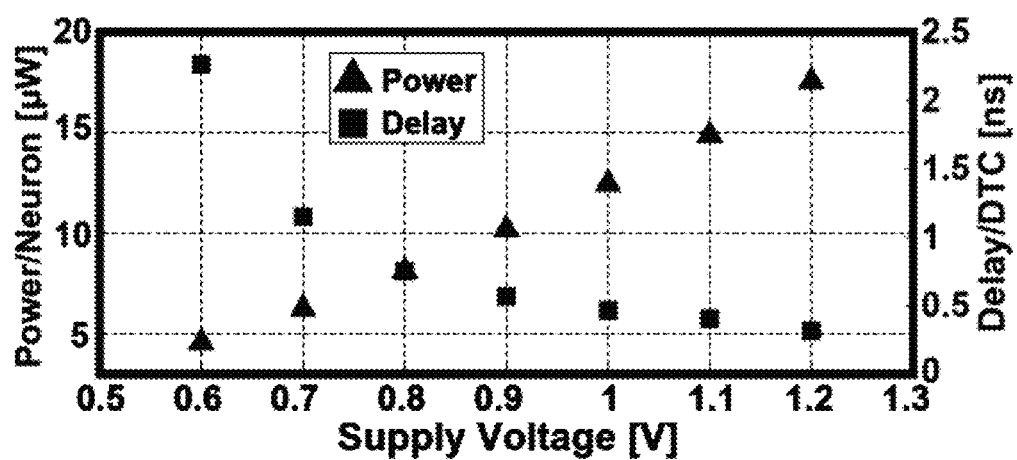
FIG. 14 illustrates exemplary simulation results of power consumption.

FIG. 14 presents exemplary power consumption of Li-based TD neuron and the delay of a single LI-DTC across different supply voltages. At 1.2 V, LI-DTC can operate at over 3 GHz while consuming below 18 pW for an Li-based neuron with 121 DTCs. FIG. 14 demonstrates the low power performance of an Li-based neuron at lower supply voltages, e.g., LI neuron consumes 6 pW only at 0.7 V and still offers excellent performance which is slightly below 1 GHz.

Figure 15:
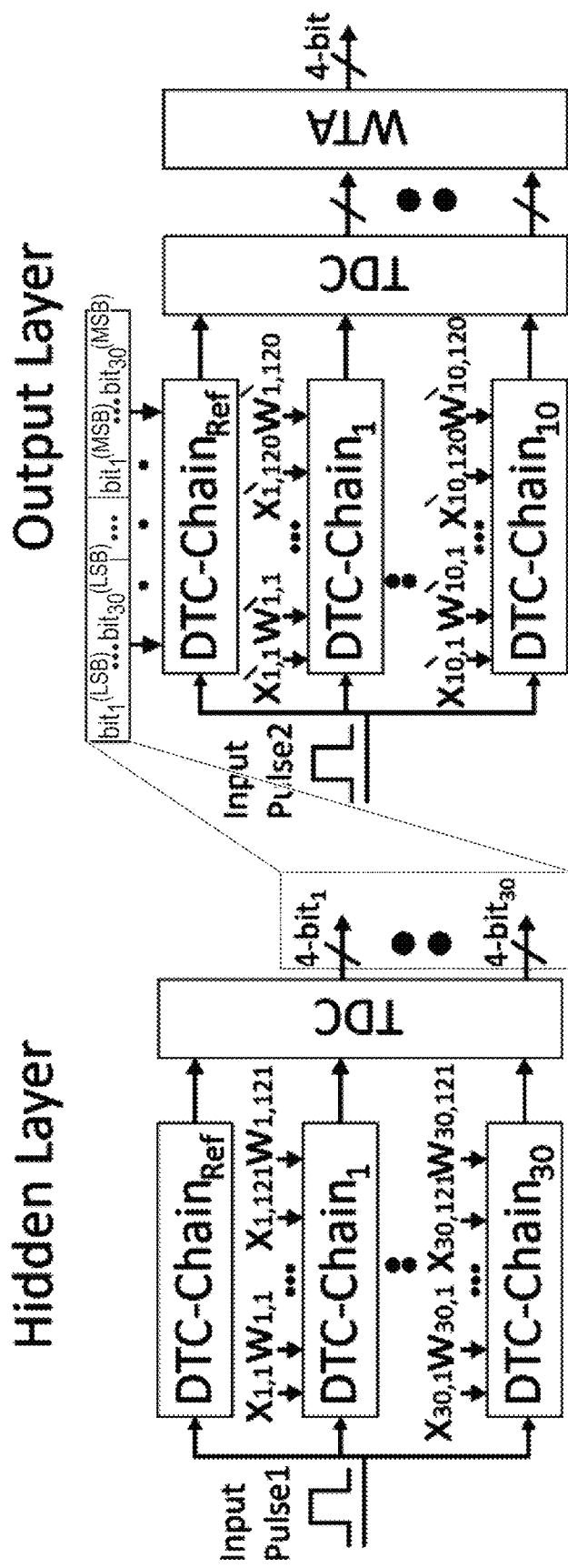
FIG. 15 illustrates a hidden layer and an output layer of the disclosed TD-ANN.

As depicted in FIG. 15, each time-domain neuron has 121-DTCs and 1-TDC, where DTCs are used to implement digitally controlled delays, while the TDC compares the final delay with a reference delay to provide the final digital output. Thus, DTCs act as a multiplier, and as the pulse passes from one element to another, the product terms will be added. When a pulse is applied to the first DTC in the chain, the signal propagates and each DTC will add a delay, based on the values of the weight and the input, where positive weights will result in faster delays. A 4-bit thermometer code TDC converts the delay signal into digital and implements ReLU. As discussed, the TDC is a phase detector that will compare the arrival time between 4 reference edges and the neuron output where the reference edges come from a reference delay line. For the next layer, since there are 30 inputs and each is represented in 4-bit thermometer code, then the output neuron will have 120 DTCs and 1 TDC. Another input pulse is applied to the DTC lines in the output layer, as shown in FIG. 15. The delay line in the output layer can be divided into 4 quarters, where we connect the LSBs of all inputs to the first quarter, then the second LSBs to the second quarter, and so on, until we connect the MSBs to the fourth quarter, as shown in FIG. 15. Lastly, WTA is applied to find the final output.

Figure 16:
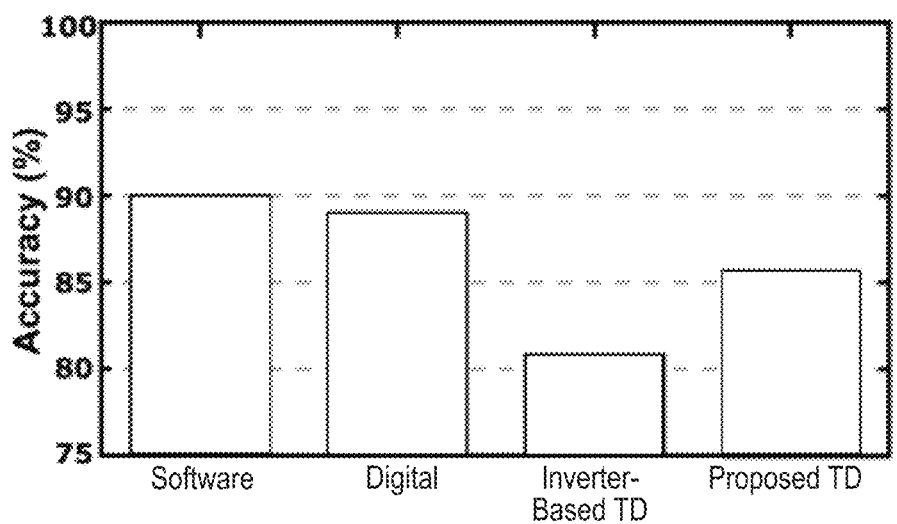
FIG. 16 illustrates exemplary classification accuracy of various comparisons.

FIG. 16 shows comparative results of classification accuracy between software, synthesized digital, inverter-based TD, and disclosed Li-based TD accelerator. The digital approach achieves the highest accuracy of about 89%, very close to the software model which has 90% accuracy. The disclosed TD core slightly falls behind the digital core with 86.5% classification accuracy. As depicted in FIG. 16, the disclosed core shows better inference performance when compared to the conventional TD core which achieves 81% accuracy, validating the solid performance of LI-DTC across different process corners, supply voltages, and temperatures shown in FIGS. 10, 12, and 14.

While the preceding discussion is generally provided in the context of deep neural networks (DNNs) and edge computing, it should be appreciated that the present techniques are not limited to such contexts. The provision of examples and explanations in such a context is to facilitate explanation by providing examples of implementations and applications. The disclosed approaches may also be utilized in other contexts.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

While the disclosed materials have been described in detail in connection with only a limited number of embodiments, it should be readily understood that the embodiments are not limited to such disclosed embodiments. Rather, that disclosed can be modified to incorporate any number of variations, alterations, substitutions or equivalent arrangements not heretofore described, but which are commensurate with the spirit and scope of the disclosed materials. Additionally, while various embodiments have been described, it is to be understood that disclosed aspects may include only some of the described embodiments. As such, that disclosed is not to be seen as limited by the foregoing description, but is only limited by the scope of the appended claims.

The invention claimed is:

1. A spatially unrolled time domain (TD) architecture, comprising:
an input and weight register having a matrix of i inputs and j weights, where i corresponds with a number of delay lines for i neurons, and j corresponds with a number of processing elements (PEs) for each delay line of the i delay lines;
an enable control register for sending a global input pulse to each of the i delay lines, wherein each delay line of the i delay lines includes the corresponding j PEs for that delay line, wherein each of the j PEs include a digital-to-time converter (DTC) such that there are j DTCs in each delay line, wherein each DTC of the j DTCs accepts a respective digital input and weight from the input and weight register, and wherein each DTC of the j DTCs in each delay line generates a time delay that is added to the global input pulse such that j time delays are added to the global input pulse of the delay line, wherein each DTC is a laddered inverter (LI) having complementary metal-oxide semiconductor (CMOS) inverters, causing each of the time delays that are each based a ratio of n-channel metal-oxide semiconductor (NMOS) versus p-channel metal-oxide semiconductor (PMOS) gate lengths;
a number of i time-to-digital converters (TDCs), each corresponding with a corresponding delay line and receiving an output from the corresponding delay line; and
a readout register that receives digital outputs from each of the i TDCs, and serially outputs a signal from each of the i delay lines based on an overall time delay for each of the i delay lines.

2. The spatially unrolled TD architecture of claim 1, wherein each weight is a 3-bit weight.

3. The spatially unrolled TD architecture of claim 1, further comprising a global reference delay line having j reference DTCs for generating j reference delays respectively corresponding to each DTC of the j DTCs in each of the i delay lines.

4. The spatially unrolled TD architecture of claim 1, further comprising a calibration stage having i calibration delay lines for calibrating each delay line, to account for process and temperature variations and tunes output delays.

5. The spatially unrolled TD architecture of claim 1, wherein each delay line includes a delay in the input pulse that is determined at least in part based on a sum of a dot product of inputs and weights, which is a result of delays generated by each of the DTCs in a corresponding delay line.

6. The spatially unrolled TD architecture of claim 1, wherein each input is a 1-bit binary input.

7. A method of mapping a series of time delays in edge computing, comprising:
providing an input and weight register having a matrix of i inputs and j weights, where i corresponds with a number of delay lines for i neurons, and j corresponds with a number of processing elements (PEs) for each delay line of the i delay lines;
providing an enable control register for sending a global input pulse to each of the i delay lines, wherein each delay line of the i delay lines includes the corresponding j PEs for that delay line, wherein each the j PEs include a digital-to-time converter (DTC) such that there are j DTCs in each delay line, wherein each DTC of the j DTCs accepts a respective digital input and weight from the input and weight register, and wherein each DTC of the j DTCs in each delay line generates a time delay that is added to the global input pulse such that i time delays are added to the global input pulse of the delay line, wherein each DTC is a laddered inverter (LI) having complementary metal-oxide semiconductor (CMOS) inverters such that there are j LIs in each delay line, the LI generates the time delay for each respective DTC, wherein each time delay of the j time delays is based a ratio of n-channel metal-oxide semiconductor (NMOS) versus p-channel metal-oxide semiconductor (PMOS) gate lengths;
providing a number of i time-to-digital converters (TDCs), each corresponding with a corresponding delay line and receiving an output from the corresponding delay line; and
providing a readout register that receives digital outputs from each of the i TDCs, and serially outputs a signal from each of the i delay lines based on an overall time delay for each of the i delay lines.

8. The method of claim 7, wherein each weight is a 3-bit weight.

9. The method of claim 7, wherein each input is a 1-bit binary input.

10. The method of claim 7, further comprising providing a global reference delay line having j reference DTCs for generating j reference delays, each of the j reference delays respectively correspond to the j DTCs in each of the i delay lines.

11. The method of claim 7, further comprising providing a calibration stage having i calibration delay lines for calibrating each delay line, to account for process and temperature variations and tunes output delays.

12. The method of claim 7, wherein each delay line provides a delay to the global input pulse that is determined at least in part based on a sum of a dot product of inputs and weights, which is a result of delays generated by each of the j DTCs in a corresponding delay line.

13. A system comprising:
a spatially unrolled (SU) time-domain (TD) architecture, the SU TD architecture comprising:
at least one delay line, wherein each delay line of the at least one delay line is a sequence of Digital-to-Time converters (DTC) and each DTC of the sequence of DTCs comprises a laddered inverter (LI) having complementary metal-oxide semiconductor (CMOS) inverters that causes a time delay that is based on a ratio of n-channel metal-oxide semiconductor (NMOS) versus p-channel metal-oxide semiconductor (PMOS) gate lengths.

14. The system of claim 13, wherein each delay line of the at least one delay line is configured to receive a respective input pulse, and wherein each DTC of the sequence of DTCs is configured to add the respective time delay to the respective input pulse, wherein each respective time delay is based on a dot product of an input and weight associated with the respective delay line.

15. The system of claim 13, further comprising a calibration stage having one or more calibration delay lines for calibrating each delay line, to account for process and temperature variations and tune output delays.

16. The system of claim 13, further comprising a global reference delay line having a sequence of one or more reference DTCs, wherein each reference DTC of the one or more reference DTCs generates a reference delay, and wherein a sum of DTCs in the sequence of DTCs is equal to a sum of reference DTCs in the sequence of reference DTCs.

17. A method comprising:
providing at least one delay line, wherein each delay line of the at least one delay line is a sequence of Digital-to-Time converters (DTC) and each DTC of the sequence of DTCs comprises a laddered inverter (LI) having complementary metal-oxide semiconductor (CMOS) inverters that causes a time delay that is based on a ratio of n-channel metal-oxide semiconductor (NMOS) versus p-channel metal-oxide semiconductor (PMOS) gate lengths.

18. The method of claim 17, wherein each DTC of the sequence of DTCs is configured to add the respective time delay to an input pulse passing through each of the at least one delay line, wherein each respective time delay is based a dot product of an input and a weight associated with each DTC in the sequence of DTCs, wherein the at least one delay line is part of a spatially unrolled (SU) time-domain (TD) architecture.

19. The method of claim 17, further comprising providing a global reference delay line having a sequence of one or more reference DTCs, wherein each reference DTC of the one or more reference DTCs generates a reference delay, and wherein a sum of DTCs in the sequence of DTCs is equal to a sum of reference DTCs in the sequence of reference DTCs.

20. The method of claim 19, further comprising providing a plurality of calibration delay lines such that each of the at least one delay line and the global reference delay line has a calibration delay line, wherein each calibration delay line of the plurality of calibration delay lines accounts for process and temperature variations from its corresponding delay line and tunes output delays received from its corresponding delay line.

* * * * *

UNITED STATES PATENT AND TRADEMARK OFFICE
CERTIFICATE OF CORRECTION

PATENT NO. : 12,504,721 B2  
APPLICATION NO. : 18/227613  
DATED : December 23, 2025  
INVENTOR(S) : Hamza Al-Maharmeh, Mohammad Alhawari and Nabil Sarhan Page 1 of 1

It is certified that error appears in the above-identified patent and that said Letters Patent is hereby corrected as shown below:

In the Claims

Column 13, Claim 7, Line 37, "that i time delays" should read "that j time delays".

Signed and Sealed this  
Third Day of February, 2026

John A. Squires  
*Director of the United States Patent and Trademark Office*